United States Patent [19]
Matsui et al.

[11] 4,184,713
[45] Jan. 22, 1980

[54] VEHICLE BODY CONSTRUCTION WITH UNSIGHTLY PART CONCEALING COVER

[75] Inventors: Takayasu Matsui, Tokorozawa; Satoshi Temino, Tokyo, both of Japan

[73] Assignee: Nissan Motor Company, Limited, Japan

[21] Appl. No.: 821,571

[22] Filed: Aug. 3, 1977

[30] Foreign Application Priority Data

Aug. 11, 1976 [JP] Japan .................................. 51/96384

[51] Int. Cl.² .............................................. B60J 1/20
[52] U.S. Cl. .............................................. 296/137 R
[58] Field of Search ........... 296/15, 91, 137 R, 137 B, 296/137 J

[56] References Cited

U.S. PATENT DOCUMENTS

| 3,232,660 | 2/1966 | Barenyi | 296/137 R |
| 3,807,787 | 4/1974 | Gotz | 296/91 |
| 4,081,195 | 3/1978 | Gotz | 296/137 R |

FOREIGN PATENT DOCUMENTS 2339679  4/1973  Fed. Rep. of Germany ........ 296/137 J

*Primary Examiner*—Philip Goodman
*Attorney, Agent, or Firm*—Robert E. Burns; Emmanuel J. Lobato; Bruce L. Adams

[57] ABSTRACT

An arch-shaped cover is arranged to straddle over the rear of the vehicle while covering the unsightly welded portions formed between the roof panel and the rear pillars of the vehicle.

19 Claims, 10 Drawing Figures

VEHICLE BODY CONSTRUCTION WITH UNSIGHTLY PART CONCEALING COVER

The present invention relates in general to a motor vehicle body construction and more particularly to a motor vehicle body construction provided with a cover member which conceals the unsightly parts of the vehicle.

It is an object of the present invention to provide a motor vehicle body construction comprising a cover which is arranged to straddle over the rear of the vehicle to conceal the unsightly welded portions formed between the roof panel and the upper section of the rear pillars of the vehicle.

It is another object of the present invention to provide a motor vehicle body construction with the cover of the type described above, which serves to reduce the manufacturing processes to reduce the production cost of the entire vehicle body.

It is still another object of the present invention to provide a motor vehicle body construction having a cover as described above, which is constructed to form a laterally extending channel at a relatively rear portion of the roof panel of the vehicle to allow, under cruising of the vehicle on a rainy day, the rainwater containing dust on the roof panel to drain into the channel thus to flow towards the lateral sides of the vehicle preventing the rear window from becoming dirty.

It is a further object of the present invention to provide a motor vehicle body construction having a cover which can enhance the styling design of the vehicle body.

Other objects and advantages of the present invention will become more apparent from the following description when taken in conjunction with the accompanying drawings, in which.

Prior to describing the construction of the vehicle body construction of the present invention, a description of a prior art vehicle body construction will be given with reference to FIG. 1 to clarify the inventive steps of the subject invention.

Figure 1:
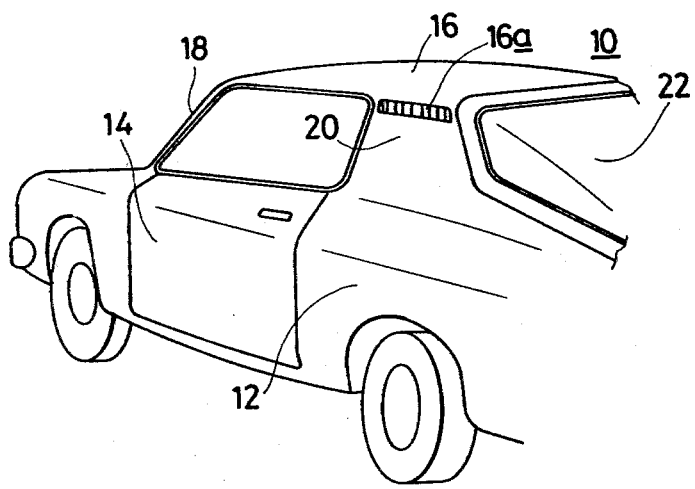
FIG. 1 is a sketch showing a prior art motor vehicle body construction.

Referring to FIG. 1, there is illustrated a motor vehicle 10 having a prior art body construction which generally comprises side panels 12 each having a door opening (no numeral), side doors 14 swingably received in the door openings, and a roof panel 16 supported by front and rear pillars 18 and 20 extending upwardly from the side panels 12. Indicated by numeral 22 is a rear window which affords the driver view to the rear. Hitherto, the assemblage of the roof panel 16 with the rear pillars 20 has been achieved such that rear side portions 16a of the roof panel 16 are connected to upper sections of the rear pillars 20 by means of welding. Doubtlessly, welding can afford a strong vehicle body construction. However, it causes additional troublesome work in which the unsightly welded portions of the construction must be finished by manual labour using a sand grinder or the like. This means increased manufacturing cost in the vehicle body construction.

Furthermore, in the conventional body construction thus described, it usually occurs, during rainy day cruising, that the rear window 22 becomes remarkably soiled because of irruption of dirty water flowing thereto from the roof panel 16 on which deposited dust is mixed with the rain droplets thereby preventing the vehicle driver from having a good rear view.

Accordingly, the present invention contemplates eliminating the above-mentioned several drawbacks encountered in the prior art vehicle body construction.

Figure 2:
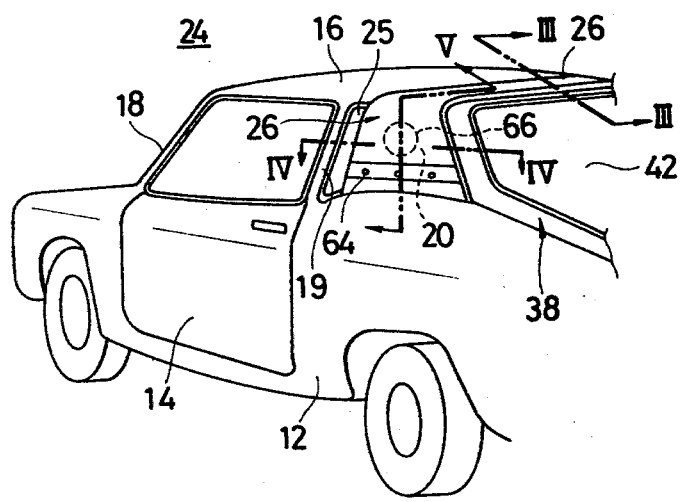
FIG. 2 is a sketch showing a motor vehicle body construction, provided with an arch-shaped cover, according to the present invention, the vehicle being shown as a hatchback type.

Referring to FIGS. 2 to 5, especially to FIG. 2, there is shown a new and improved vehicle body construction 24 applied to a hatchback type motor vehicle which is equipped with a swingably liftable window or lid 38 at its rear. The construction 24 of the subject invention, similar to the abovementioned prior art construction 10, comprises side panels 12 respectively having door openings (no numerals), side doors 14 swingably received in the openings, a roof panel 16 supported by front, center and rear pillars 18, 19 and 20 which extend upwardly from the side panels 12. A small side window 25 is arranged in each side panel 12 at a position between the center pillar 19 and the rear pillar 20. As shown, an archshaped cover 26 is added to constitute an important part of the vehicle body construction 24 of the subject invention. The cover 26 is constructed of a metal plate and/or a plastics plate. As will be understood hereinlater, the cover 26 acts to canceal some unsightly parts or portions of the vehicle body and to prevent the rear window from being remarkably soiled or contaminated by the interruption of the dirty water flowing thereto from the roof panel 16 during cruising on a rainy day.

Now, a description of important vehicle body parts other than the cover 26 will be given with reference to FIGS. 3 to 5 before describing of the arrangement and configuration of the cover 26.

Figure 3:
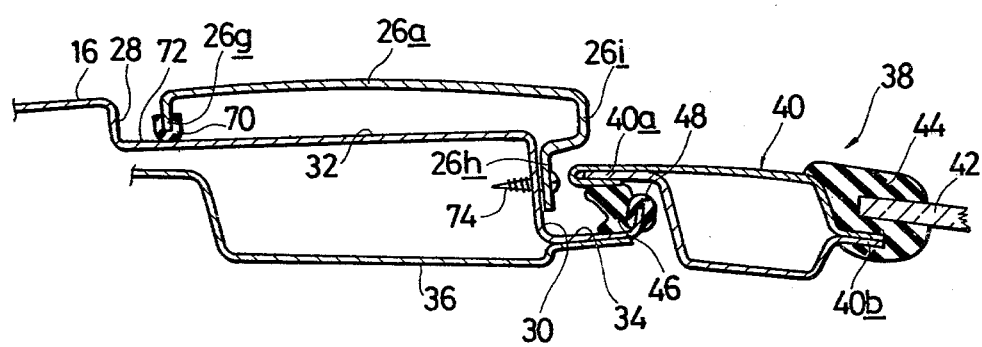
FIG. 3 is a cross section view taken along the line III—III of FIG. 2.

Referring to FIG. 3, a sectional view taken along the line III—III of FIG. 2 is illustrated. As seen in this drawing, the roof panel 16 is formed at its rear section with first and second steps 28 and 30 both extending perpendicularly to the longitudinal axis of the vehicle to form first and second recessed portions 32 and 34. The second recessed portion 34 is connected to a rear end of a rear upper rail 36 extending across the vehicle. Usually, the rail 36 is firmly connected at its longitudinal ends to later-mentioned rear pillars 20. Indicated by 38 is a hatchback lid of the vehicle which lid includes a hollow frame portion 40 with a crimped front flange portion 40a and a rear flange portion 40b, a glass pane 42, and a sealing strip or weather strip 44 sealingly disposed between the glass pane 42 and the frame portion 40. It should be understood that the second recessed portion 34 of the roof panel 16 and rear portions of the later-mentioned rear pillars 20 constitute a part of a frame portion defining an opening for the hatchback lid 38. The crimped front flange portion 40a of the lid 38 is seated on a sealing strip 46 bonded to the second recessed portion 34 of the roof panel 16. Although not well shown in the drawings, the lid 38 is hinged to a suitable portion of the roof panel 16 so as to pivot about the vicinity of the sealing strip 46, that is in a manner permitting the right end of the lid 38 to be liftable. Indicated by numeral 48 is a welt which covers an upwardly projecting end of the second recessed portion 34.

Figure 4:
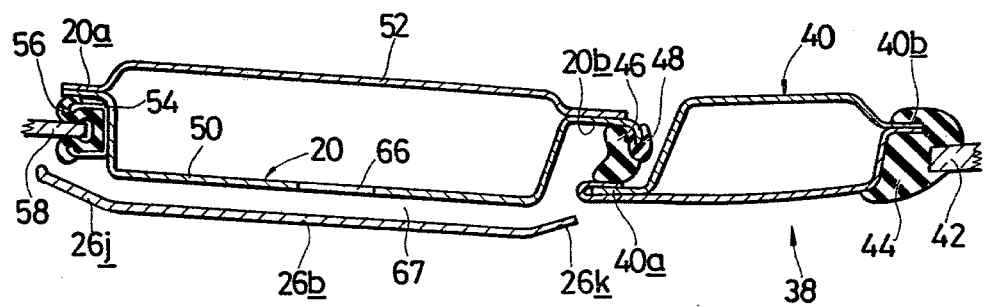
FIG. 4 is a cross section view taken along the line IV—IV of FIG. 2.

In FIG. 4, there is shown a sectional view taken along the line IV—IV of FIG. 2, in which the rear pillar 20 is illustrated to cooperate with a side section of the above-mentioned hatchback lid 38. The rear pillar 20 comprises outer and inner panels 50 and 52 which are assembled together to form a hollow construction with front and rear flange portions 20a and 20b. The rear flange portion 20b is provided with an extension of the before-mentioned sealing strip 46 for sealingly seating thereon and crimped front flange portion 40a of the lid 38. An extension of the welt 48 covers an outwardly projecting end (no numeral) of the rear flange portion 20b. Bonded to a front flat surface of the outer panel 50 is a sash 54 which holds therein a rubber sealing 56 for sealingly guiding a liftable glass pane 58 of the small size window 25.

Figure 5:
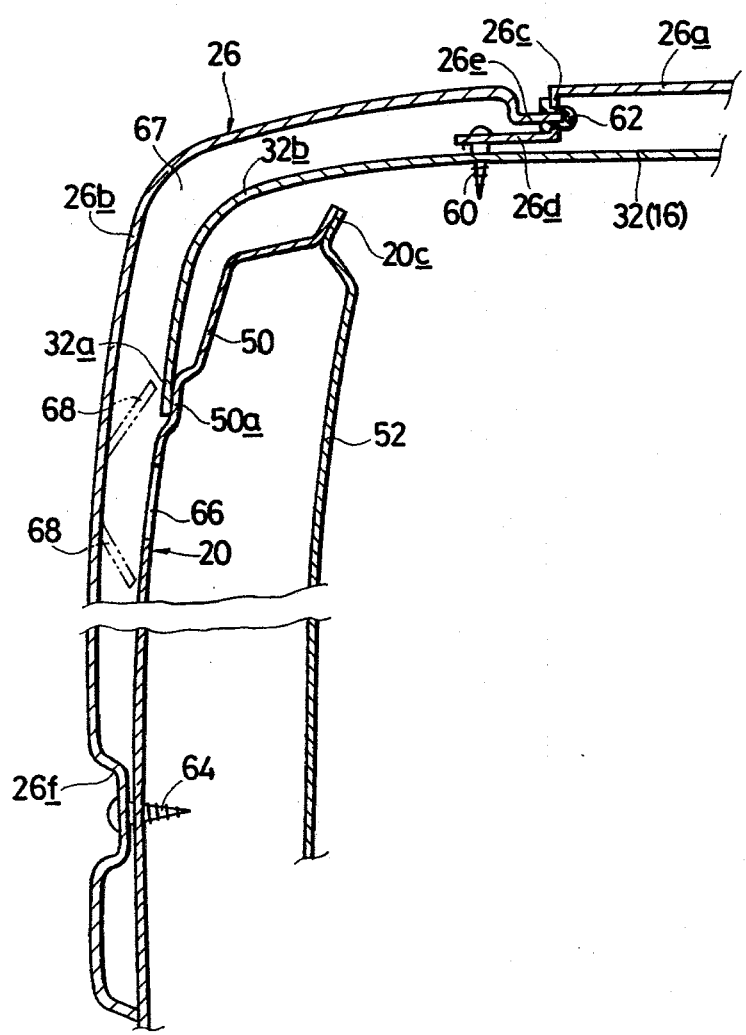
FIG. 5 is a cross section view taken along the line V—V of FIG. 2.

Referring to FIG. 5, there is clearly shown the arrangement in which the roof panel 16 is welded at each lateral downward end 32a of the first recessed portion 32 thereof to a step portion 50a formed on a relatively upper portion of the outer panel 50 of the rear pillar 20. In this drawing, a flange portion arranged on an upper side of one rear pillar 20 is designated by numeral 20c.

The arrangement of the cover 26 with respect to the roof panel 16 and the rear pillars 20 will be described next.

As best seen in this FIG. 5, the cover 26 generally comprises an upper panel member 26a and two side panel members 26b (only one of which is illustrated) which are assembled together to construct an arch with the upper panel member 26a located between the two side panel members 26b. The upper panel member 26a is formed at its lateral sides with downwardly bent portions 26c with flanges 26d. The flanges 26d are fixed to the first recessed portion 32 of the roof panel 16 by means of screws 60 for tightly mounting the upper panel member 26a on the portion 32. Each of the side panel members 26b is bent substantially through a right angle at a its relatively upper portion to spacedly cover a corner 32b formed in each lateral side of the first recessed portion 32 and has a leading upper end 26e sealingly and tightly set through a sealing member 62 in an opening (no numeral) formed in each downwardly bent portion 26c of the upper panel member 26a and has a lower recessed portion 26f fixed through screws 64 to the outer panel 50 of the rear pillar 20. It should be now noted that each of the side panel members 26b is arranged to canceal the unsightly welded lateral downward end 32a of the first recessed portion 32 of the roof panel 16. Designated by numeral 66 is an opening for providing ventilation of the compartment of the vehicle through the interior of the hollow rear pillar 20 and a space 67 defined between the first recessed portion 32 of the roof panel 16 and the side panel member 26b of the cover 26. For protecting the opening 66 from being subjected to rushing water, some vane members 68 are fixed to the side panel member 26b in the illustrated manner.

The configuration of the arch-shaped cover 26 will become more clear from FIGS. 3 and 4.

As seen in FIG. 3, the main portion of the upper panel member 26a of the cover 26 is substantially flush with the main portion of the roof panel 16, and the member 26a is formed at its front and rear sides with first and second downwardly bent portions 26g and 26h, respectively. The first bent portion 26g is attached through a sealing member 70 to a relatively front section of the first recessed portion 32 to form a laterally extending channel 72 between the first step 28 and the first bent portion 26g, as shown. This channel 72 is for guiding the dirty rainwater coming from the main portion of the roof panel 16 to flow toward the sides of the vehicle to prevent the glass pane 42 of the hatchback lid 38 from becoming dirty. The second downwardly bent portion 26h is fixed by screws 74 to the second step 30 and is formed with a rearwardly extending projection 26i which is sized to conceal an unsightly gap defined between the second step 30 and the crimped front flange portion 40a.

As shown in FIG. 4, each of the side panel members 26b of the cover 26 is formed at its front and rear sides with slightly inwardly bent portions 26j and 26k which conceal respectively the sash 54 of the small side window 25 and a gap defined between the outer panel 50 of the rear pillar 20 and the crimped front flange portion 40a.

Although in the previous description, it has been explained that the arch-shaped cover 26 is constructed of three parts such as the upper panel member 26a and the two side panel members 26b, it is of course possible to form the cover 26 in one piece construction.

Figure 6:
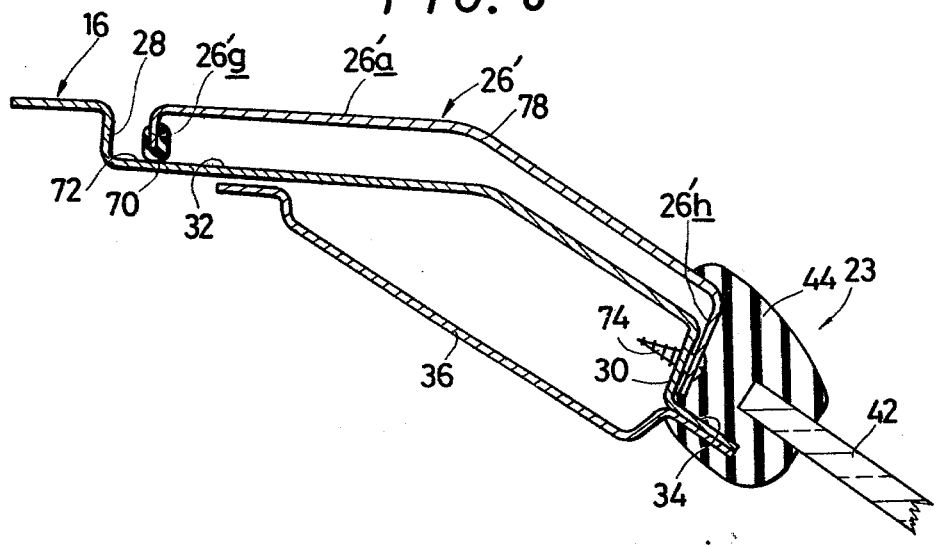
FIGS. 6 and 7 are views similar to FIGS. 3 and 4 respectively, but showing another embodiment in which the arch-shaped cover is applied to a sedan-type motor vehicle.
Figure 7:
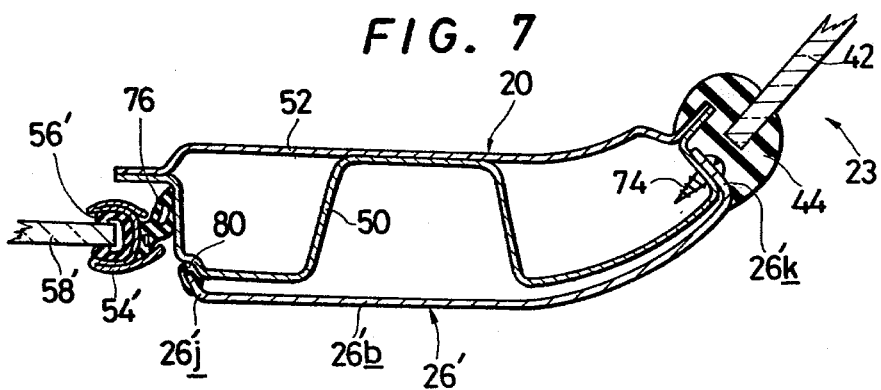

FIGS. 6 and 7 illustrate another embodiment of the subject invention applying to a sedan-type motor vehicle having a fixed rear window 23. As will be understood, the vehicle body construction hereinshown is not provided with the side windows such as the windows 25 of FIG. 2. This means that the vehicle is of the type illustrated in FIG. 1 in which the rear pillars 20 are arranged to construct part of the door openings. The body construction of this second embodiment comprises the fixed rear window 23 and, similar to the above-mentioned first embodiment, first and second steps 28 and 30 are provided with first and second recessed portions 32 and 34, as shown. The second recessed portion 34 is connected to a stationary rear upper rail 36 extending across the vehicle in the above-stated manner. The rear window 23 comprises a glass pane 42 and a weather strip 44 stationarily and sealingly connecting the glass pane 42 to the window frame portion of the roof panel 16. The body construction of this embodiment further comprises, as seen in FIG. 7, a rear pillar 20 consisting of outer and inner panels 50 and 52 which are assembled to form two vertically extending hollow constructions by providing the outer panel 50' with an inward projected vertically extending recessed portion as shown. This complicated construction is made for increasing the mechanical strength of the rear pillar 20.

Indicated by numeral 58' is a liftable glass pane which is guided through a sealing member 56' by a sash 54' is fixed to the side proper 14. For achieving an assured sealing between the door 14 in closed position and a front flat surface of the outer panel 50, a weather strip 76 is mounted on the outer periphery of the sash 54' in the illustrated manner.

In this embodiment, however, a slightly modified cover 26' is used. The cover 26', similar to the before-mentioned cover 26, comprises an upper panel member 26'a and two side panel members 26'b (only one of which is illustrated) which are assembled together to construct an arch in substantially the same manner as described hereinbefore. As shown in FIG. 6, the upper panel member 26'a is flush at its main portion with the main portion of the roof panel 16 and is formed at its front and rear sides with first and second downwardly bent portions 26'g and 26'h, respectively. The first bent portion 26'g is attached through a weather strip or sealing member 70 to a relatively front section of the first recessed portion 32 to form a laterally extending channel 72 between the first step 28 and the first bent portion 26'g. The second downwardly bent portion 26'h is fixed through screws 74 to the second step 30. As shown, the weather strip 44 is arranged to conceal the second downwardly bent portion 26'h, the screws 74 and the second recessed portion 34. For accommodation with the shape of the first recessed portion 32 of the roof panel 16, the upper panel member 26'a may be bent at 78. As shown in FIG. 7, each of the side panel members 26'b is formed at its front and rear sides with slightly inwardly bent portions 26'j and 26'k. The bent portion 26'j is attached through a sealing strip 80 to a recessed portion (no numeral) formed in the front corner of the outer panel 50, and the other bent portion 26'k is connected by screws 74 to a rear flat surface of the outer panel 50 while being covered or concealed by the weather strip 44. Also in this embodiment, the upper panel member 26'a and the side panel members 26'b may be constructed in one piece.

It should be noted that the second embodiment now described discloses the advantageous concealing function of the cover 26' in which the rear pillar 20 can be of any kind of construction to increase the mechanical strength thereof without taking the external apperance thereof into consideration.

Figure 8:
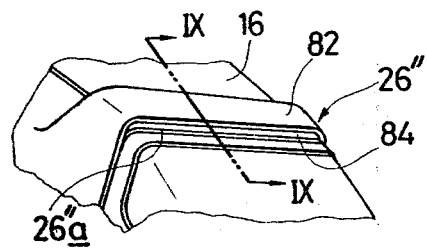
FIG. 8 is a sketch showing a vehicle body construction provided with a modified form of the cover.
Figure 9:
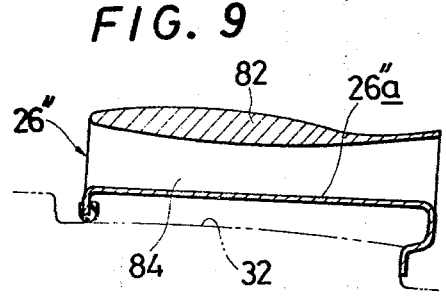
FIG. 9 is a cross section view taken along the line IX—IX of FIG. 8.
Figure 10:
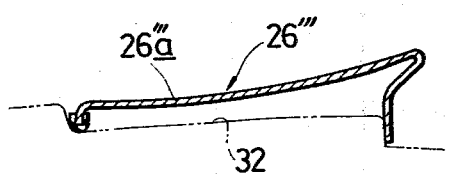
FIG. 10 is a view similar to FIG. 9 but showing another modified form of the cover.

Referring to FIGS. 8 to 10, there are shown two modified covers 26" (FIGS. 8 and 9) and 26''' (FIG. 10) each having air rectifying means thereon. The cover 26" shown in FIGS. 8 and 9 is integrally formed with an aero-foil 82 which straddles an upper panel member 26"a to define a through space 84 between the foil 82 and the upper panel member 26"a. The cover 26''' of FIG. 10 includes an upper panel member 26'''a having a rearwardly rising and smoothly curved upper surface. By the provision of these air rectifying means, not only stabilized high speed cruising of the vehicle is achieved but also such undesirable phenomenon as contamination of the rear window of the vehicle, under cruising on a fine day, with dry dust being whirled up by the wind rising behind the moving vehicle is almost eliminated.

Now, it should be noted that the covers 26, 26', 26" and 26''' may be painted, coated or plated over their exteriorly exposed surfaces to enhance the styling design of the vehicle body.

With these vehicle body constructions embodying the present invention, the following merits and advantages are achieved:

(1) By the provision of the covers 26, 26', 26" and 26''', the unsightly parts or portions such as the welded sections formed between the roof panel 16 and the rear pillars 20 are concealed to maintain the desired external appearance of the vehicle without using any other decorative members. This induces, in turn, the omission of the troublesome finishing of the welded sections in the vehicle body manufacturing processes. Thus, the low cost automatic welding technique can be used in such sections. Furthermore, due to the sheltering effect of the cover 26 against the rain droplets, it is unnecessary to provide the ventilation opening 66 of the rear pillar 20 with the specially designed expensive grille member which has caused a requirement to provide a direct connection between the opening 66 and the interior of the compartment of the vehicle by means of a tube disposed in the rear pillar 20. This also means simple and economical production of the vehicle body construction.

(2) Since the cover 26, 26', 26" or 26''' is constructed to form the channel 72 between the first step 28 of the roof panel 16 and the first bent portion 26g of the upper panel members 26a and 26'a of the cover, the rainwater gathering dust on the roof panel 16 is caused to drain into the channel 72 flowing towards the sides of the vehicle. This provides a benefit in which the rear window (or the glass pane 42 of the hatchback lid) is prevented from being dirtied thus affording a good rear view to the vehicle driver.

(3) In case of the first embodiment shown in FIGS. 2 to 5, the unsightly portions or parts such as the gap defined between the cramped front flange portion 40a of the hatchback lid 38 and the second step portion 30 of the roof panel 16 and the sashes 54 of the small side window 25 are concealed by the cover 26. Thus, it is unnecessary to provide an accurate or delicate work in assembling the hatchback lid 38 with the vehicle body. Also, it is not necessary to mount some expensive decorative molding members on the sashes 54, which has been so often employed in the conventional vehicle body construction. These induce simple and inexpensive production of the vehicle body construction.

(4) Since the covers 26, 26', 26" and 26''' are detachably connected to the vehicle body proper by means of screws 60 and 64, the change of an old cover by a new fashionable one, which may satisfy the user's desire, is readily made.

What is claimed is:

1. A vehicle body construction comprising:
 a roof panel having a step to form a recessed portion extending substantially across a rear end region of said roof panel;
 a rear pillar having an exteriorly exposed surface to which a laterally extending end of said recessed portion of said roof panel is connected; and
 a cover straddling over said recessed portion as well as said exteriorly exposed surface to conceal a portion where said laterally extending end is connected to said exteriorly exposed surface, said cover being bent at its front edge portion toward said recessed portion of said roof panel to form a laterally extending channel portion between said step and said front edge portion of said cover.

2. A vehicle body construction as claimed in claim 1, further comprising a sealing strip sealingly disposed in a space defined between a leading end of said front edge portion and a corresponding surface portion of said recessed portion.

3. A vehicle body construction as claimed in claim 1, in which a rear section of said recessed portion and a rear section of said rear pillar constitute a part of a frame portion defining a window opening for a rear window.

4. A vehicle body construction as claimed in claim 3, in which said cover has a rear edge portion fixed to a rear portion of said recessed portion.

5. A vehicle body construction as claimed in claim 4, in which said rear window is a hatchback lid which is hingedly mounted on said vehicle to cover said window opening.

6. A vehicle body construction as claimed in claim 5, in which a portion of said rear edge portion of said cover forms a rearwardly extending projection to conceal a part consisting of the rearwardly extending end of said recessed portion and a front edge portion of said hatchback lid.

7. A vehicle body construction as claimed in claim 5, in which said cover has at its vertically extending section front and rear portions which are sized to conceal a rear edge portion of a side window and a gap defined between a rear end of said rear pillar and said front edge portion of said hatchback lid, respectively, said rear edge portion of said side window being located in the vicinity of a front end of said rear pillar.

8. A vehicle body construction as claimed in claim 4, in which said rear window comprises a glass pane received in said window opening and a sealing strip tightly disposed in a space defined between outer peripheral edges of said glass pane and said frame portion, said sealing strip being arranged to conceal said rear edge portion of said cover.

9. A vehicle body construction as claimed in claim 1, in which said rear pillar comprises outer and inner panels which are assembled together to form a hollow construction, said outer panel being arranged outside of said vehicle and having said exteriorly exposed surface.

10. A vehicle body construction as claimed in claim 9, in which said outer panel of said rear pillar is formed with an opening to provide a fluid communication between the compartment of said vehicle and the atmosphere via the interior of the hollow rear pillar, said opening being located in a position concealed by said cover.

11. A vehicle body construction as claimed in claim 10, in which said cover is provided with a vane member at a position near said opening of said rear pillar to obstruct water from pouring into said opening from outside of said vehicle.

12. A vehicle body construction as claimed in claim 9, in which said rear pillar comprises outer and inner panels which are assembled together to form a hollow construction, said outer panel being arranged outside of said vehicle and having said exteriorly exposed surface, further in which said outer panel of said rear pillar is formed with a vertically extending recess to form at least two vertically extending hollow bodies which are bounded by said outer and inner panels to increase the mechanical strength of said rear pillar.

13. A vehicle body construction as claimed in claim 1, in which said cover is provided with air rectifying means by which the vehicle cruising is considerably stabilized.

14. A vehicle body construction as claimed in claim 13, in which said means is an aero-foil.

15. A vehicle body construction as claimed in claim 1, in which said laterally extending end of said recessed portion is welded to said exteriorly exposed surface.

16. A vehicle body construction as claimed in claim 1, in which said cover is detachably connected to said roof panel and said rear pillar.

17. A vehicle body construction comprising:
a roof panel having a step defining a recessed portion extending substantially across a rear end region of said roof panel;
a rear pillar having an exteriorly exposed surface to which a laterally extending end of said recessed portion of said roof panel is connected;
a cover disposed over said recessed portion while spacedly covering the exteriorly spaced surface to conceal the same, said cover being bent at its front edge portion toward said recessed portion of said roof panel to form a laterally extending channel portion between said step and said front edge portion of said cover; and
a sealing strip sealingly disposed in a space defined between a leading end of said front edge portion and a corresponding surface portion of said recessed portion.

18. A vehicle body construction comprising:
a roof panel having a step defining a recessed portion extending substantially across a rear end region of said roof panel;
a rear pillar having an exteriorly exposed surface to which a laterally extending end of said recessed portion of said roof panel is connected;
a cover disposed over said recessed portion while spacedly covering the exteriorly exposed surface to conceal the same, said cover having a rear edge portion fixed to a rear portion of said recessed portion; and
a rear section of said recessed portion and a rear section of said rear pillar, said sections constituting a part of a frame portion defining a window opening for a rear window.

19. A vehicle body construction comprising:
a roof panel having a step to form a recessed portion extending substantially across a rear end region of said roof panel;
a rear pillar having an exteriorly exposed surface to which a laterally extending end of said recessed portion of said roof panel is welded; and
a cover straddling over said recessed portion while spacedly covering the exteriorly exposed surface to conceal the same.

* * * * *